United States Patent [19]

Benedetto, Jr.

[11] Patent Number: 5,464,076

[45] Date of Patent: Nov. 7, 1995

[54] WHEEL SUPPORT FOR SECURING A WHEEL OF A WHEELED VEHICLE TO A TRANSPORT VEHICLE

[76] Inventor: Alfred P. Benedetto, Jr., 34 Beede Hill Rd., Fremont, N.H. 03044

[21] Appl. No.: 252,770

[22] Filed: Jun. 2, 1994

[51] Int. Cl.[6] .................................................... B60T 3/00
[52] U.S. Cl. ................................................ 188/32; 410/30
[58] Field of Search ......................... 188/4 R, 32; 410/3, 410/30, 49, 50

[56] References Cited

U.S. PATENT DOCUMENTS

| | | | |
|---|---|---|---|
| 1,536,611 | 5/1925 | Duke | 188/32 X |
| 3,542,157 | 11/1970 | Noah | 188/32 X |
| 4,955,459 | 9/1990 | Murphy | 188/32 |
| 5,173,018 | 12/1992 | Kissel et al. | 410/30 |

*Primary Examiner*—Robert J. Oberleitner
*Assistant Examiner*—Kevin D. Rutherford
*Attorney, Agent, or Firm*—Davis, Bujold & Streck

[57] ABSTRACT

A device for securing a wheel of a wheeled vehicle to a transport vehicle. The device has a wheel receiving channel pivotably attached to a frame and a locking apparatus. The locking apparatus automatically releasably locks the channel to the frame when the wheel of the vehicle is driven into the channel. The device is also removably slidably mounted within a brace which in turn is mounted to the transport vehicle such that the device may be easily removed from the transport vehicle.

6 Claims, 4 Drawing Sheets

5,464,076

WHEEL SUPPORT FOR SECURING A WHEEL OF A WHEELED VEHICLE TO A TRANSPORT VEHICLE

This invention relates to a device for securing a wheel of a wheeled vehicle to a transport vehicle. Initially, the device is in the open position when the wheeled vehicle rides into a channel of the device and locks into place thereby securing the wheel.

BACKGROUND OF THE INVENTION

Transporting wheeled vehicles generally requires the use of tire chucks and tie-down straps to secure the wheeled vehicle to the transport vehicle. This is especially a problem for motorcycles, however, the problem also exists for other wheeled vehicles. The typical means for transporting motorcycles is to secure the motorcycle in a transport vehicle using various straps and braces. Up to this point, there is no known device simple to operate for securing the wheel of a vehicle.

OBJECT OF THE INVENTION

Accordingly, it is an objective of the present invention to provide a device capable of securing the wheel of a wheeled vehicle to a transport vehicle.

Another objective of the invention is to provide a device which when driven onto by the wheeled vehicle automatically locks into place, thereby securing the wheel of the wheeled vehicle.

Another objective of the invention is to provide a device which can be easily slidably mounted to the bed of the transport vehicle and removed therefrom.

SUMMARY OF THE INVENTION

According to the invention there is provided a device for securing a wheel of a wheeled vehicle to a transport vehicle comprising a frame; a wheel channel pivotably attached to said frame and said channel; and, a locking means for releasably locking said channel to said frame.

Also according to the invention there is provided a device for securing a wheel of a wheeled vehicle to a transport vehicle comprising a frame; a wheel channel pivotably attached to said frame, said wheel channel having a lock tab; a resiliently biased locking means for locking said lock tab to said frame, said locking means comprising a lock rod having a chamfer to slidably engage said lock tab under the influence of the resilient bias, and a handle to allow unlocking of said channel; a bed brace to slidably receive said frame to secure said device to said transport vehicle and a fastening member to secure said frame to said bed brace; and, a visual indicator for providing visual indication of a locked position of said channel to said frame.

BRIEF INTRODUCTION TO THE DRAWINGS

The invention will now be described, by way of example, with reference to-the accompanying drawings in which.

DETAILED DESCRIPTION OF THE INVENTION

Figure 1:
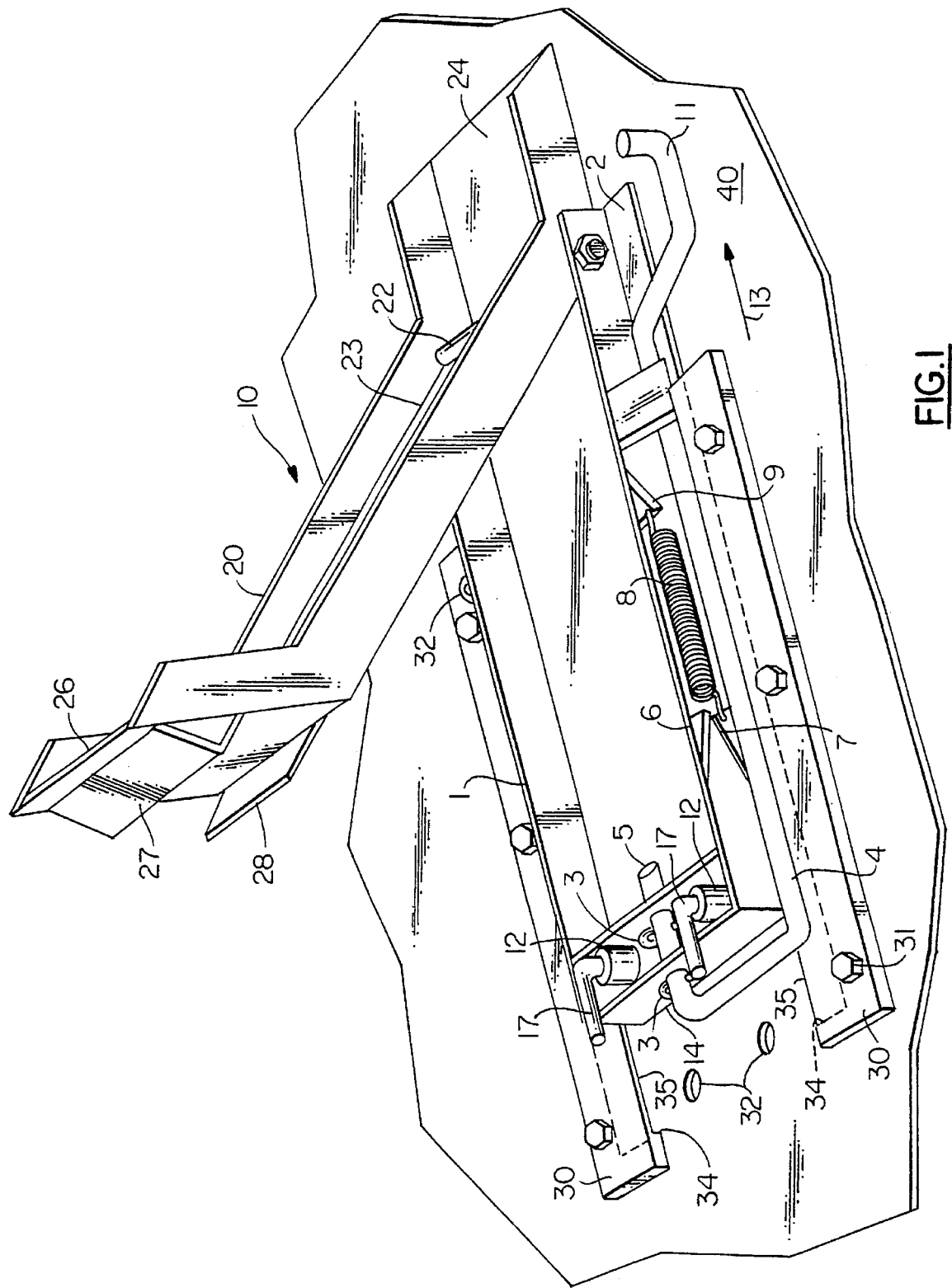
FIG. 1 is a perspective view of the device of the present invention shown in the open position and slidably attached to a bed brace which in turn is mounted to the transport vehicle bed.

Turning first to FIG. 1, a wheel support 10 is shown constructed in accordance with the present inventive concepts. The support 10 comprises a frame 1 having a base 2, and a wheel receiving channel 20 pivotably attached to frame 1 with hinge bolt 22. Also attached to frame 1 is lock rod 4 which is biased in direction 13 with extension spring 8. Extension spring 8 is attached to frame 1 at a first end by frame post 9. The extension spring 8 is also attached at a second end to the lock rod 4 by lock rod post 7. Lock rod 4 is prevented from being pulled in a further direction 13 by cotter pins 3 located at the end of rod 4. Lock rod 4 further has a chamfered lock rod end 5 which is used to engage lock tab 28 of wheel receiving channel 20. Of course, a lock hole may be used in place of a lock tab.

Bed braces 30 are attached to transport vehicle bed 40 by using bolts 31. Bed braces 30 each have a recess 35 in which to receive base 2 of wheel support 10. Wheel support 10 slides underneath bed braces 30 within recesses 35 until end 14 of the wheel support 10 engages end stop 34 of the bed braces 30 such that base pin hole 12 is aligned with bed pin hole 32. Once bed pin hole 32 is aligned with base pin hole 12, a suitable fastening device may be placed through the holes 12 and 13, such as pin 33 in order to secure the wheel support 10 to the bed brace 30.

Wheel receiving channel 20 comprises bed 23, ramp 24, wheel receiving channel end stop 26 and lock tab 28. Initially, wheel receiving channel 20 is found in an open position (FIG. 1) in which ramp 24 contacts transport vehicle bed 40. To close the wheel support 10, a wheeled vehicle merely needs to be driven so that the wheel of the vehicle rides up ramp 24 into bed 23 thereby closing wheel receiving channel 20. Since lock rod end 5 is chamfered, locktab 28 engages chamfered lock rod end 5 and moves lock rod 4 in a direction away from wheel receiving channel 20. Once lock tab 28 clears chamfered lock rod end 5, the spring 8 pulls lock rod 4 in direction 13 so as to return lock rod 4 to its initial position. However, at this point, lock tab 28 is beneath chamfered lock rod end 5 as shown in FIG. 2.

Figure 2:
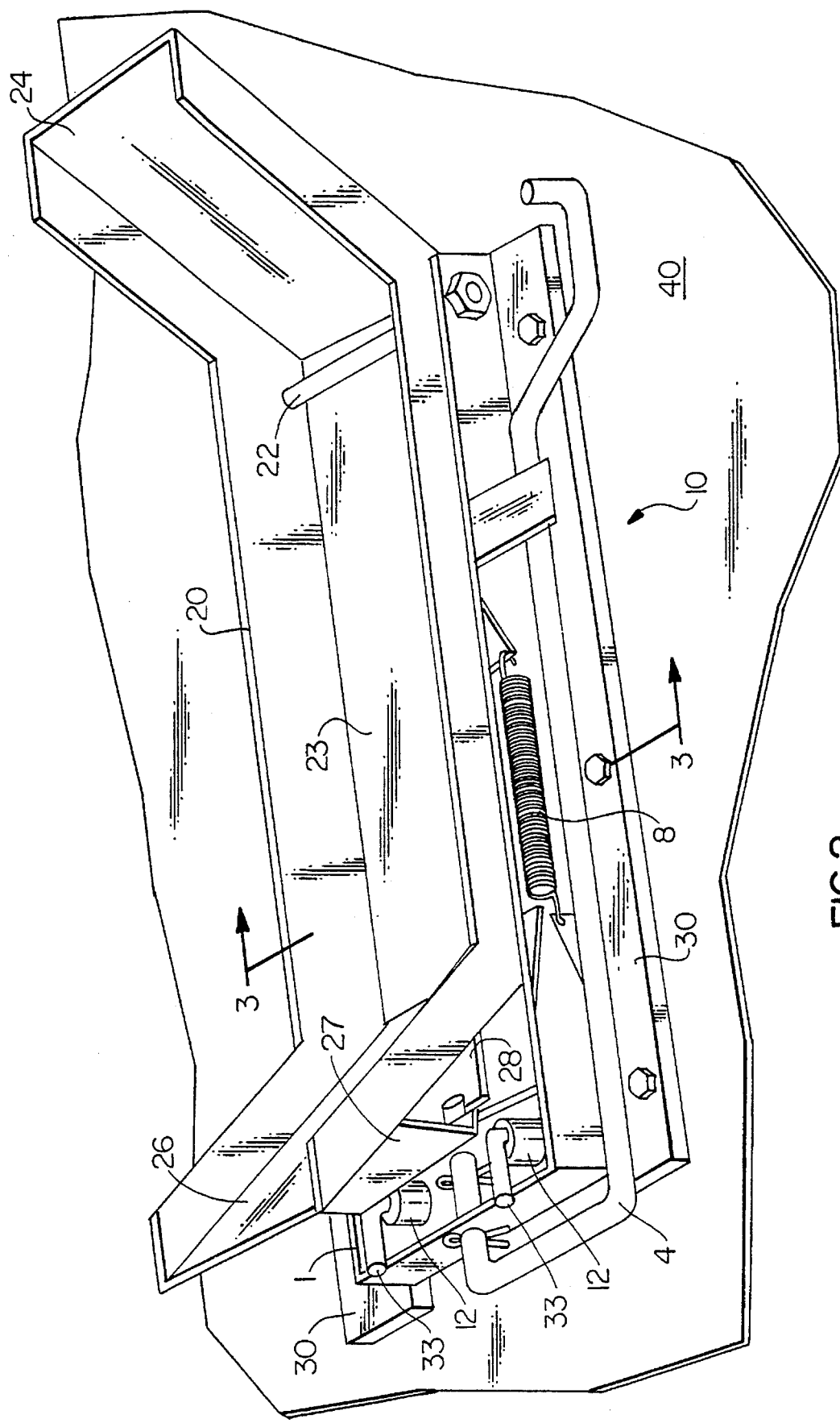
FIG. 2 is a perspective view of the device of the present invention shown in the closed position.

Turning now to FIG. 2, there is shown the wheel support 10 in a closed position and also secured by bed brace 30. Wheel support 10 is locked into bed brace 30 using a suitable fastening means such as bed pin 33. Once the device is in the closed position, pin safety stop 27 prevents pins 33 from, for example, vibrating out of holes 12. It should be noted here that the wheel support 10 must be fully secured to bed brace 30 before attempting to load a vehicle onto wheel receiving channel 20. The distinction between FIGS. 1 and 2 with respect to the fully secured wheel support 10 within bed brace 30 is merely to show two different positions of the wheel support 10 with respect to the bed brace 30. The wheel support 10 does not close in a locked position at the same time that the base 2 slides into grooves 35. A visual indicator 6 (see FIG. 1) is also attached to frame 1 which provides visual indication of the lock rod 4 being in its locked position. That is, one need only look at lock rod post 7 to determine whether it is aligned with visual indicator 6.

Figure 3:
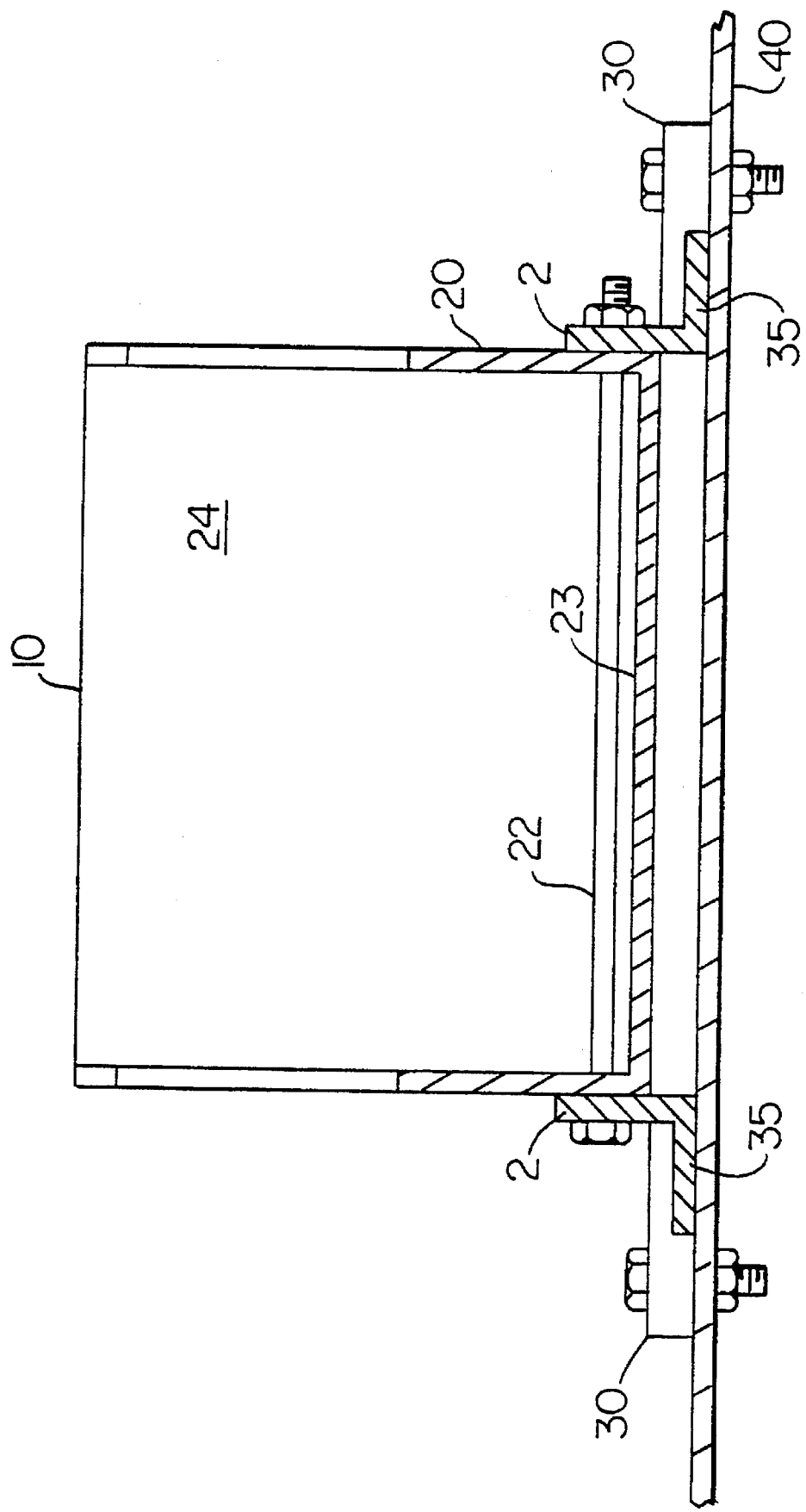
FIG. 3 is a diagrammatic cross-section along section 3—3 of FIG. 2 of the device of the present invention showing the base of the device slidably attached to the bed brace and transport vehicle bed.

FIG. 3 is a cross-section of FIG. 1 along section 3—3 of wheel support 10 in which base 2 is secured by bed brace 30 which in turn is attached to transport vehicle bed 40.

Figure 4:
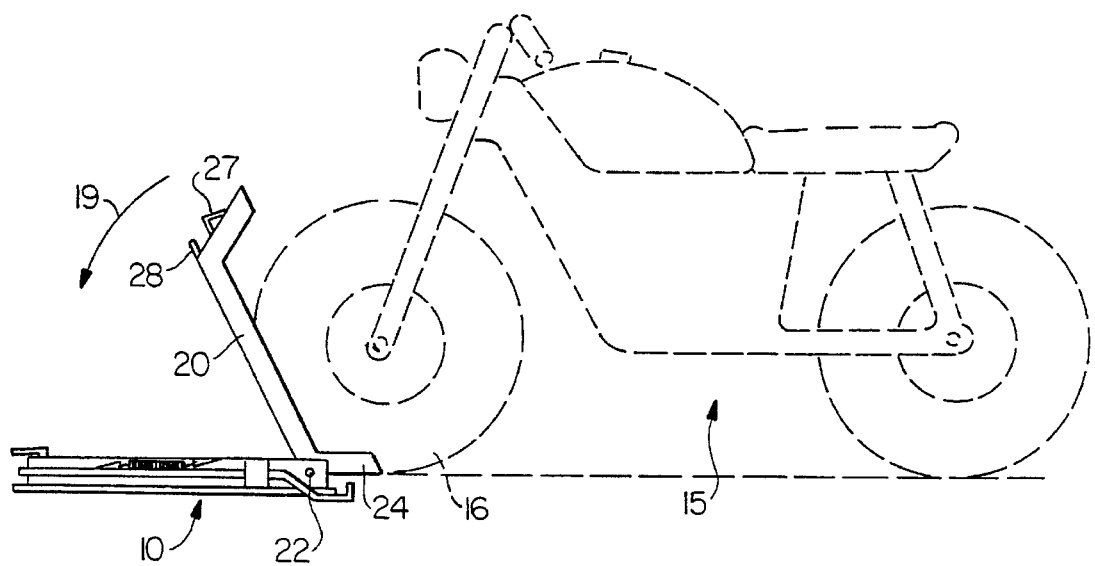
FIG. 4 is a side view of the device of the present invention showing a motorcycle being driven onto the device.

Referring now to FIG. 4, there is shown a motorcycle 15 having a front wheel 16 which is being loaded onto the wheel support 10. Wheel 16 rides up ramp 24 of wheel receiving channel 20 having lock tab 28. As the motorcycle 15 moves in a forward direction, wheel 16 rides up ramp 24 causing wheel receiving channel 20 to rotate about hinge 22 in a direction 19 thereby causing lock tab 28 to engage in chamfered lock rod end 5, not shown, causing extension spring 8 to extend lock rod 4. Once lock tab 28 is passed chamfered lock rod end 5, extension spring 8 returns lock rod 4 to its original position.

Figure 5:
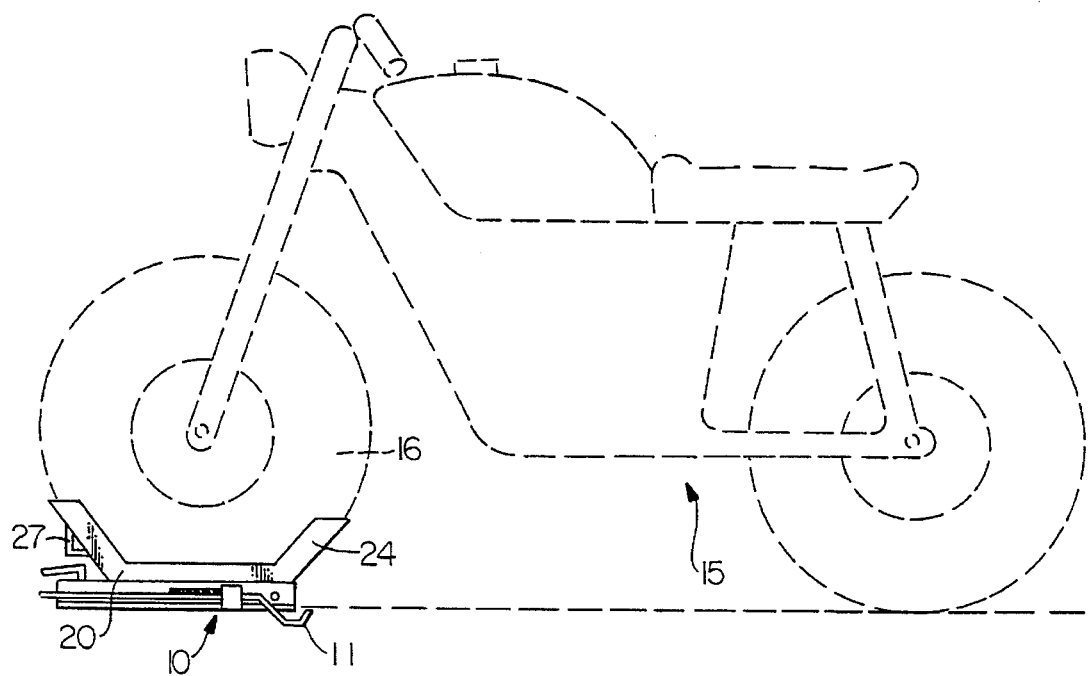
FIG. 5 is a side view of the device of the present invention showing the motorcycle locked into the closed position of the device.

FIG. 5 shows the motorcycle 15 with wheel 16 secured within the wheel support 10. In order to release wheel 16, one merely need to push on lock rod handle 11 (e.g. by a riders foot or by a rod handle release tool not shown) causing extension spring 8 to extend causing chamfered lock rod end 5 to move away from lock tab 28 thereby freeing lock tab 28 in order to rotate wheel receiving channel 20 about hinge 22 in an opposite direction of direction 19 thereby allowing the motorcycle 15 to roll off the wheel support 10.

We claim:

1. A device having a longitudinal axis for securing a wheel of a wheeled vehicle to a transport vehicle having a bed comprising:

a frame;

a wheel receiving channel pivotably attached to said frame and being substantially parallel to said longitudinal axis;

a locking means for releasably locking said channel to said frame;

a bed brace having an elongate recess mountable to said bed of said transport vehicle, said frame being removably slidable between said recess and said bed along said longitudinal axis, said longitudinal axis being substantially perpendicular to an axis of rotation of said wheel of said wheeled vehicle when said wheel is secured within said channel; and, a fastening member to secure said frame relative to said bed brace and said transport vehicle.

2. The device according to claim 1 wherein said locking means comprises:

a resiliently biased lock rod mounted to the frame operable to releasably engage the channel.

3. The device according to claim 2 wherein the channel comprises a locking tab and said lock rod has a chamfered end to slidably engage said lock tab to activate the locking means.

4. The device according to claim 2 wherein said lock rod has a handle to release the locking means to unlock said channel.

5. The device according to claim 1 comprising a visual indicator providing visual indication of a locked position of said channel to said frame.

6. A device having a longitudinal axis for securing a wheel of a wheeled vehicle to a transport vehicle having a bed comprising:

a frame;

a wheel receiving channel pivotably attached to said frame, said wheel channel having a lock tab;

a resiliently biased locking means for locking said lock tab to said frame, said locking means comprising a lock rod having a chamfer to slidably engage said lock tab under the influence of the resilient bias, and a handle to allow unlocking of said channel;

a bed brace having an elongate recess mountable to said bed of said transport vehicle, said frame being removably slidable between said recess and said bed along said longitudinal axis, said longitudinal axis being substantially perpendicular to an axis of rotation of said wheel of said wheeled vehicle when said wheel is secured within said channel;

a fastening member to secure said frame to said transport vehicle; and, a visual indicator for providing visual indication of a locked position of said channel to said frame.

* * * * *